United States Patent
Murschall et al.

(10) Patent No.: US 7,182,997 B2
(45) Date of Patent: *Feb. 27, 2007

(54) OPAQUE, WHITE FILM WITH LOW TRANSPARENCY MADE FROM A CRYSTALLIZABLE THERMOPLASTIC AND HAVING ADDITIONAL FUNCTIONALITY

(75) Inventors: Ursula Murschall, Nierstein (DE); Ulrich Kern, Ingelheim (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/779,156

(22) Filed: Feb. 8, 2001

(65) Prior Publication Data

US 2002/0136880 A1    Sep. 26, 2002

(30) Foreign Application Priority Data

Feb. 19, 2000   (DE) ............................... 100 07 719

(51) Int. Cl.
*B32B 1/08*     (2006.01)
*B32B 7/02*     (2006.01)
*B32B 27/32*    (2006.01)
*B32B 27/06*    (2006.01)
*C08J 3/20*     (2006.01)

(52) U.S. Cl. .................... 428/220; 428/213; 428/480; 428/500; 523/351; 524/423

(58) Field of Classification Search ............. 428/220, 428/357, 480, 475.2, 488.1, 690, 212, 34.7, 428/35.7, 213, 500; 523/351; 524/423
See application file for complete search history.

(56) References Cited

U.S. PATENT DOCUMENTS 4,252,885 A    2/1981  McGrail et al.
4,780,402 A   10/1988  Remmington
5,660,931 A    8/1997  Kim et al.
6,521,351 B2 *  2/2003  Murschall et al. .......... 428/480
6,641,924 B1 * 11/2003  Peiffer et al. ............. 428/480
6,939,600 B2 *  9/2005  Murschall et al. .......... 428/212

FOREIGN PATENT DOCUMENTS

EP      A 0 296 620       12/1988
EP      0 857 749 A1       8/1998
WO      WO 94/13476        6/1994
WO      WO 94/13481        6/1994

OTHER PUBLICATIONS

Kunststoff-Journal 8, No. 10, 30-36 and No. 11, 36-31 (1974).
Maria E. Nadal and Ambler Thompson, Nist Reference Goniophotometer for Specular Gloss Measurements, Jun. 2001, 14 Pages, vol. 73, No. 917, Jun. 2001, Gaithersburg, MD.
Byk-Gardner GmbH and Byk-Gardner, USA, Einfurung, 3 Pages, Germany, Byk Gardner-GmbH, Byk-Gardner-USA.
Mebpraxis.
Reflektometer Als Hilfsmittal Zur Glanzbeurteilung an Ebenen Anstrich-und Kunststoff-Oberflachen, 5 Pages, Jan. 1982, Din Deutsches Institute Fur Normung Ev.
ISO, Paints and Varnishes, International Standard, 1994, 12 Pages, International Organization for Standardization, Switzerland.

* cited by examiner

*Primary Examiner*—Rena Dye
*Assistant Examiner*—Lawrence Ferguson
(74) *Attorney, Agent, or Firm*—ProPat, L.L.C.

(57) ABSTRACT

The invention relates to an opaque, white film with a thickness of from 10 to 500 μm whose principal constituent is a crystallizable thermoplastic. The film comprises at least barium sulfate and at least one optical brightener. The barium sulfate and/or the optical brightener are incorporated directly into the crystallizable thermoplastic or are fed as a masterbatch during film production. At least one surface of the film bears a functional coating with a thickness of from 5 to 100 nm, in order to confer on the film surface an additional function such as sealability, printability, metallizability, sterilizability, antistatic properties, aroma barrier properties or improved adhesion to materials which would not adhere to the film surface without the coating, for example photographic emulsions.

15 Claims, No Drawings

OPAQUE, WHITE FILM WITH LOW TRANSPARENCY MADE FROM A CRYSTALLIZABLE THERMOPLASTIC AND HAVING ADDITIONAL FUNCTIONALITY

The invention relates to an opaque, white biaxially oriented film with low transparency made from a crystallizable thermoplastic and having a thickness of from 10 to 500 µm, where at least one surface of the film has been provided with an additional functionality. The film comprises at least barium sulfate and an optical brightener, and has good orientability, low transparency, and also very good optical and mechanical properties. The invention further relates to a process for producing this film and to the use of the film.

BACKGROUND OF THE INVENTION

In many food and drink packaging applications, there is demand for a high level of barrier action with respect to gases, water vapor and flavors. For this reason, use is usually made of polypropylene films which have been metallized or have been coated with polyvinylidene chloride (PVDC). In the case of PVDC-coated films—as with metallizing—the coating takes place in a second operation, which makes the packaging markedly more expensive. Ethylene-vinyl alcohol copolymers (EVOH) likewise exhibit strong barrier action. However, films modified with EVOH are particularly sensitive to moisture, and this limits their range of application. In addition, due to their poor mechanical properties they have relatively high thickness or have to be laminated with other materials at high cost. The disposal of EVOH-modified films after they have been used is also more complicated than that of other films. In addition to this, some raw materials are not approved by the authorities or are unsuitable for producing packaging for food or drink.

DESCRIPTION OF THE INVENTION

The object of the present invention was to provide an opaque, white biaxially oriented film with a thickness of from 10 to 500 µm and having at least one additional functionality and which, besides having good orientability, good mechanical properties and good optical properties and a low Yellowness Index, above all has a high level of whiteness and low transparency and can be produced simply and cost-effectively and does not cause any disposal problems.

The good optical properties include uniform, streak-free coloration, low luminous transmittance/transparency ($\leq 30\%$), acceptable surface gloss ($\geq 10$), and also a low Yellowness Index (dependent on thickness, $\leq 45$ for 250 µm films and $\leq 20$ for 50 µm films).

The good mechanical properties include a high modulus of elasticity ($E_{MD} \geq 3300$ N/mm$^2$; $E_{TD} \geq 4200$ N/mm$^2$), and also good tear strengths (in MD$\geq 120$ N/mm$^2$; in TD$\geq 170$ N/mm$^2$) and finally also good longitudinal (MD) and transverse (TD) elongations at break (in MD$\geq 120\%$; in TD$\geq 50\%$).

Good orientability includes excellent capabilities of the film for orientation during its production, both longitudinally and transversely, without break-offs.

The novel film should moreover be recyclable, that is to say that any cut material arising during continuous film production can be fed back into the production operation, in particular without loss of optical or mechanical properties, so that the film can still be used for interior applications and in constructing exhibition stands, for example.

This object is achieved by an opaque white film with a thickness of from 10 to 500 µm whose principal constituent is a crystallizable thermoplastic, and whose characterizing features are that the film comprises at least barium sulfate and at least one optical brightener, that the barium sulfate and/or the optical brightener have been incorporated directly into the crystallizable thermoplastic or are fed as a masterbatch during film production, and that at least one surface of the film bears a functional coating with a thickness of from 5 to 100 nm.

The novel film comprises, as principal constituent, a crystallizable thermoplastic. Examples of suitable crystallizable or semicrystalline thermoplastics are polyethylene terephthalate, polybutylene terephthalate and polyethylene naphthalate, and preference is given to polyethylene terephthalate.

For the purposes of the present invention, a crystallizable thermoplastic is
  a crystallizable homopolymer;
  a crystallizable copolymer;
  a crystallizable compound;
  a crystallizable recycled material, or
  another type of crystallizable thermoplastic.

The present invention also provides a process for producing this film, comprising:
6. production of a film from at least one base layer and, if desired, (an) outer layer(s), by extrusion or, if desired, coextrusion;
7. biaxial orientation of the film;
8. heat-setting of the oriented film; and
9. functionalization of at least one surface of the film prior to, during or after steps 2 and/or 3.

The novel film may have one layer, i.e. have only one base layer and the functional coating, or else have two or more layers, i.e. have one base layer, at least one outer layer on the base layer and the functional coating, the combination of base layer and outer layer expediently being produced by way of coextrusion technology.

According to the invention, the film comprises at least barium sulfate as pigment, and the amount of pigment here is preferably from 0.2 to 40% by weight, based on the weight of the crystallizable thermoplastic. The barium sulfate is preferably fed by way of what is known as masterbatch technology during film production.

According to the invention, the film comprises at least one optical brightener, and the amount of the optical brightener used here is from 10 to 50,000 ppm, in particular from 20 to 30,000 ppm, particularly preferably from 50 to 25,000 ppm, based on the weight of the crystallizable thermoplastic. It is preferable for the optical brightener, too, to be fed by way of what is known as masterbatch technology during film production.

The optical brighteners according to the invention are capable of absorbing UV radiation in the region from 360 to 380 nm and of re-emitting this as longer-wavelength, visible blue-violet light.

Suitable optical brighteners are bisbenzoxazoles, phenylcoumarins and bisstearylbiphenyls, in particular phenylcoumarin, and particularly preferably triazine phenylcoumarin, which is obtainable as the product ˚Tinopal (Ciba-Geigy, Basle, Switzerland), or else ˚Hostalux KS (Clariant, Germany), or ˚Eastobrite OB-1 (Eastman).

Besides the optical brightener, blue dyes soluble in polyester may also be added if this is useful. Dyes which have proven successful are cobalt blue, ultramarine blue and anthraquinone dyes, in particular Sudan Blue 2 (BASF, Ludwigshafen, Germany).

The amounts of the blue dyes used are from 10 to 10,000 ppm, in particular from 20 to 5000 ppm, particularly preferably from 50 to 1000 ppm, based on the weight of the crystallizable thermoplastic.

It was highly surprising that the use of the abovementioned combination of barium sulfate and optical brightener and, if present, blue dyes in the films in conjunction with the increased longitudinal stretching ratio during film production gave the desired result.

It is also very surprising that the cut material produced while film production is running can also be reused as regrind for the production process without any adverse effect on the Yellowness Index of the film.

A preferred embodiment of the invention uses precipitated grades of barium sulfate. Precipitated barium sulfate is obtained as a fine-particle colorless powder from barium salts and sulfates or sulfuric acid, and the particle size of the powder can readily be controlled via the conditions of precipitation. Precipitated barium sulfate may be prepared by the usual processes, which are described in Kunststoff-Journal 8, No. 10, 30–36 and No. 11, 36–31 (1974).

According to the invention, the amount of barium sulfate is from 0.2 to 40% by weight, preferably from 0.5 to 30% by weight, particularly preferably from 1 to 25% by weight, based on the weight of the crystallizable thermoplastic.

The average grain size of the barium sulfate is relatively small and is preferably from 0.1 to 5 μm, particularly preferably from 0.2 to 3 μm (Sedigraph method). The density of the barium sulfate used is from 4 to 5 g/cm$^3$.

In one particularly preferred embodiment, the novel film comprises, as principal constituent, a crystallizable polyethylene terephthalate, and also from 1 to 25% by weight of precipitated barium sulfate, appropriately with a particle diameter of from 0.4 to 1 μm, particularly preferably $^\delta$Blanc fixe XR-HX or Blanc fixe HXH from Sachtleben Chemie, Germany.

The surface gloss of the novel film, measured to DIN 67530 (measurement angle 20°) is greater than or equal to 10, preferably greater than or equal to 15.

The luminous transmittance (transparency) of the novel film, measured to ASTM-D 1003, is less than or equal to 30%, preferably less than or equal to 25%. The coloration is uniform and streak-free over the entire running length and the entire width of the film.

As a result of the synergistic action of the additives barium sulfate, optical brightener, and, if present, blue dye in conjunction with an optimized longitudinal stretching ratio, the novel film is whiter, that is to say has less yellow tinge, and has lower light transmittance, that is to say has lower transparency than a film provided only with barium sulfate as pigment.

The longitudinal modulus of elasticity (ISO 527-1-2) of the novel film is greater than or equal to 3300 N/mm$^2$, preferably greater than or equal to 3500 N/mm$^2$. Its transverse modulus of elasticity (ISO 527-1-2) is greater than or equal to 4200 N/mm$^2$, preferably greater than or equal to 4400 N/mm$^2$.

The standard viscosity SV (DCA) of the polyethylene terephthalate preferably used for the novel film, measured in dichloroacetic acid to DIN 53728, is from 600 to 1100, preferably from 700 to 1000.

The intrinsic viscosity IV (DCA) is calculated from the standard viscosity SV (DCA) as follows:

$$IV(DCA)=6.67 \cdot 10^{-4} SV(DCA)+0.118$$

The opaque white polyethylene terephthalate film which comprises at least barium sulfate, an optical brightener and, if desired, blue dyes may have either one layer or else two or more layers.

In the embodiment having two or more layers, the film has a structure of at least one base layer and at least one outer layer, and particular preference is given here to a three-layer A-B-A or A-B-C structure.

For the embodiment having two or more layers, it is appropriate for the polyethylene terephthalate of the base layer to have a standard viscosity similar to that of the polyethylene terephthalate of the outer layer(s) directly adjacent to the base layer.

In one particular embodiment, the outer layers may also be composed of a polyethylene naphthalate homopolymer or of a polyethylene terephthalate-polyethylene naphthalate copolymer, or of a compound. In this particular embodiment, the thermoplastics of the outer layers likewise have a standard viscosity similar to that of the polyethylene terephthalate of the base layer.

In the embodiment having two or more layers, the barium sulfate, and also the optical brightener and, if present, the blue dye are preferably present in the base layer. However, modification of the outer layers is also possible, if required.

Unlike in the single-layer embodiment, in the film having two or more layers the amounts given for the additives are based on the weight of the thermoplastics in the layer provided with the additive(s).

There may also, if required, be provision of a scratch-resistant coating on one or more sides of the novel film.

In addition, the novel film is easy to recycle without pollution of the environment and without loss of mechanical properties, making it suitable, for example, for use as short-lived promotional placards, labels or other promotional requisites.

An example of a production process for producing the novel film is extrusion on an extrusion line.

According to the invention, the barium sulfate, the optical brightener and, if present, the blue dye may be incorporated into the thermoplastic as early as when the thermoplastic polymer is prepared, or else fed into the extruder by way of masterbatch technology during film production.

It is particularly preferable for the barium sulfate, the optical brightener and, if present, the blue dye to be added by way of masterbatch technology. The additives here are fully dispersed in a solid carrier material. Carrier materials which may be used are the thermoplastic itself, e.g. the polyethylene terephthalate, or else other polymers sufficiently compatible with the thermoplastic.

It is important that the particle size and the bulk density of the masterbatch(es) are similar to the particle size and the bulk density of the thermoplastic, so that uniform dispersion is achieved, and with this a uniform level of whiteness and thus also uniform opacity.

The polyester films may be produced by known processes from a polyester with, if desired, other polymers, and also with the optical brightener, the barium sulfate, if desired with the blue dye, and/or with a usual amount of from 0.1 to a maximum of 10% by weight of other customary additives, either in the form of monofilms or else in the form of, if desired, coextruded films having two or more layers and with identical or differently constructed surfaces, where one surface may have provision of pigment, but no pigment is present in the other surface. In addition, known processes have been used to provide one or both surfaces of the film with a functional coating.

According to the invention, at least one of the surfaces of the film is coated so that on the finished film the thickness of the coating is from 5 to 100 nm, preferably from 20 to 70 nm, in particular from 30 to 50 nm. The coating is preferably applied in-line, i.e. during the film-production process, appropriately prior to the transverse stretching. Particular preference is given to application by reverse gravure-roll coating, which is capable of applying the coatings extremely uniformly with the layer thicknesses mentioned. The coatings are preferably applied as solutions, suspensions or dispersions, particularly preferably as an aqueous solution, suspension or dispersion. The coatings mentioned give the surface of the film an additional function, making the film sealable, printable, metallizable, sterilizable or antistatic, for example, or improving the flavor barrier, for example, or permitting adhesion to materials (e.g. photographic emulsions) which would not adhere to the surface of the film without the coating. Examples of substances/compositions which give additional functionality are:

acrylates, for example as described in WO 94/13476, ethylvinyl alcohols, PVDC, waterglass ($Na_2SiO_4$), hydrophilic polyesters, such as PET/IPA polyesters containing the sodium salt of 5-sulfoisophthalic acid, as described in EP-A-0 144 878 or U.S. Pat. No. 4,252,885, for example, or in EP-A-0 296 620, vinyl acetates, as described in WO 94/13481, for example, polyvinyl acetates, polyurethanes, silanes, the alkali metal or alkaline earth metal salts of $C_{10}$–$C_{18}$ fatty acids, butadiene copolymers with acrylonitrile or methyl methacrylate, methacrylic acid, acrylic acid or esters thereof.

The substances/compositions which give the additional functionality may comprise from 0.05 to 5% by weight, preferably from 0.1 to 3% by weight, of the customary additives, e.g. antiblocking agents or pH stabilizers.

The substances/compositions mentioned are applied as dilute solution, emulsion or dispersion, preferably as aqueous solution, emulsion or dispersion, to one or both surfaces of the film, and the solvent is then evaporated. If the coatings are applied in-line prior to the transverse stretching, it is usual for the heat treatment during the transverse stretching and subsequent heat-setting to suffice for evaporating the solvent and drying the coating. The dried coatings then have layer thicknesses of from 5 to 100 nm, preferably from 20 to 70 nm, in particular from 30 to 50 nm.

In the preferred extrusion process for producing the polyester film, the polyester material melted in the extruder is extruded through a slot die and quenched on a chill roll, as a substantially amorphous prefilm. This prefilm is then reheated and stretched longitudinally and transversely, or transversely and longitudinally, or longitudinally, transversely and again longitudinally and/or transversely. According to the invention, the stretching temperatures are from $T_g+10$ K to $T_g+60$ K ($T_g$ is the glass transition temperature), the longitudinal stretching ratio according to the invention is from 2 to 5, in particular from 2.5 to 4.5, and the transverse stretching ratio is from 2 to 5, in particular from 3 to 4.5, and the ratio for any second longitudinal stretching carried out is from 1.1 to 3. The first longitudinal stretching may, if desired, be carried out simultaneously with the transverse stretching (simultaneous stretching). Stretching is followed by the heat-setting of the film at oven temperatures of from 200 to 260° C., in particular from 220 to 250° C. Following the heat-setting, the film is cooled and wound up.

An entirely unexpected finding was that the process parameters for the longitudinal stretching are a variable which significantly affects the optical properties (transparency) of the film. The longitudinal process parameters include in particular the longitudinal stretching ratio and the longitudinal stretching temperature. It was highly surprising that the transparency could be markedly affected by varying the longitudinal stretching ratio. If, for example, a film plant produces a film whose transparency is above the values according to the invention, novel films with a lower transparency can be produced by increasing the longitudinal stretching ratio during the longitudinal stretching procedure. A relative increase of 7% in the longitudinal stretching ratio gave a relative reduction of from 15 to 20% in transparency.

A major advantage is that the production costs for the novel film are only insignificantly higher than those for a film made from standard polyesters. The other processing properties and use properties of the novel film remain essentially unchanged or indeed show improvement. In addition, the method of film production ensures that the regrind can be used again in a proportion of up to 50% by weight, preferably from 10 to 50% by weight, based in each case on the total weight of the film, without any appreciable adverse resultant effect on the physical properties of the film.

The surprising combination of excellent properties makes the novel film highly suitable for a variety of different applications, such as interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, in applications associated with food or drink or, depending on the functionality of one or both surfaces, as a photographic film, as a graphic film, a laminatable film, a metallizable film or a printable film.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance/Transparency

For the purposes of the present invention, the luminous transmittance/transparency is the ratio of total light transmitted to the amount of incident light.

Luminous transmittance is measured using "Hazegard plus" test equipment to ASTM D 1003.

Surface Defects and Uniform Coloration

Surface defects and uniform coloration are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA) = 6.67 \cdot 10^{-4} SV(DCA) + 0.118$$

Yellowness Index

The Yellowness Index YID is the deviation from the colorless condition in the "yellow" direction and is measured to DIN 6167.

Whiteness

The whiteness is determined according to Berger, generally using more than 20 mutually superposed layers of film, and with the aid of the ®ELREPHO electrical reflectance photometer from Zeiss, Oberkochem, Germany, with standard aluminant C and a 2° standard observer. The whiteness is defined as W=RY+3RZ−3RX. W=whiteness, and RY, RZ and RX=corresponding reflection factors using the Y, Z and X color measurement filter. The whiteness standard used is a barium sulfate pressing (DIN 5033, Part 9). A detailed description is found in Hansl Loos "Farbmessung" [Color measurement], Verlag Beruf and Schule, Itzehoe (1989), for example.

In the examples and comparative examples below, each of the films is a single-layer opaque white film, produced on the extrusion line described.

EXAMPLE 1

An opaque white film of 50 μm thickness was produced and comprised polyethylene terephthalate (RT32, KoSa, Germany) as principal constituent, 18% by weight of barium sulfate (®Blanc fixe XR-HX, Sachtleben Chemie), 200 ppm of optical brightener (®Tinopal, Ciba-Geigy, Basle) and 40 ppm of blue dye (®Sudan Blue 2, BASF, Ludwigshafen). The additives barium sulfate, optical brightener and blue dye were added as masterbatches.

The polyethylene terephthalate used to prepare the masterbatches had a standard viscosity SV (DCA) of from 900 to 1100.

The masterbatch (1) was composed of clear polymer, 50% by weight of barium sulfate and 600 ppm of optical brightener. The masterbatch (2) comprised 2000 ppm of blue dye, besides clear polymer.

Prior to extrusion, 36% by weight of the masterbatch (1), 2% by weight of the masterbatch (2) and 62% by weight of clear polymer were dried at a temperature of 150° C. and then melted in the extruder. The melt was extruded through a flat-film die, cooled by a chill roll and then further processed.

The longitudinal stretching ratio set during film production was 3.1. After longitudinal stretching, both sides of the film were coated with an aqueous dispersion, using reverse gravure-roll coating. The dispersion comprised, besides water, 4.2% by weight of hydrophilic polyester (PET/IPA polyester containing the sodium salt of 5-sulfoisophthalic acid, ®SP41, Ticona, USA), 0.15% by weight of colloidal silicon dioxide (®Nalco 1060, Deutsche Nalco Chemie, Germany) as antiblocking agent, and also 0.15% by weight of ammonium carbonate (Merck, Germany) as pH buffer. The wet application weight was 2 g/m² for each side coated. After transverse stretching, the calculated thickness of the coating was 40 nm.

EXAMPLE 2

Example 1 was repeated, except that the film had no blue dye.

EXAMPLE 3

The mixing specification of the film of Example 3 and its coating corresponded to those of the film of Example 2, but the longitudinal stretching ratio was increased to 3.3, while the longitudinal stretching temperatures remained unchanged.

EXAMPLE 4

A coextruded, opaque white ABA film of thickness 75 μm was produced, where A are the outer layers and B is the base layer. The mixing specification for the base layer of 71 μm thickness corresponded to the mixing specification of Example 2. The outer layers of 2 μm thickness comprised 93% by weight of clear polymer, and also 7% by weight of a masterbatch which comprised, besides clear polymer, 10,000 ppm of silicon dioxide (®Sylobloc, Grace, Germany). This film has high surface gloss. The longitudinal stretching ratio was 3.3. The film was coated in a manner similar to that of Example 1, but only on one side.

Comparative Example 1

Example 3 was repeated. The longitudinal stretching ratio was reduced to 2.8, while the longitudinal stretching temperatures remained unchanged. The film was not coated after longitudinal stretching.

Comparative Example 2

Comparative Example 1 was repeated, but the film was not provided with optical brightener. The film comprised only 18% by weight of barium sulfate, and this was incorporated directly during preparation of the polymer. The standard viscosity of the barium sulfate-containing polymer was 810. The film was not coated after longitudinal stretching.

The opaque white PET films produced in Examples 1 to 4 and the films produced according to Comparative Examples 1 and 2 had the property profiles shown in the table below:

TABLE

| Properties | Ex. 1 | Ex. 2 | Ex. 3 | Ex. 4 | Comp. Ex. 1 | Comp. Ex. 2 |
|---|---|---|---|---|---|---|
| Thickness [μm] | 50 | 50 | 50 | 75 | 50 | 50 |
| Surface gloss side 1 | 20 | 20 | 20 | 165 | 20 | 20 |
| (Measurement angle 20°) side 2 | 20 | 20 | 20 | 165 | 20 | 20 |
| Luminous transmittance/ transparency [%] | 20 | 20 | 16 | 12 | 25 | 24 |
| Yellowness Index (YID) | 12 | 14 | 14 | 18 | 15 | 24 |

TABLE-continued

| Properties | Ex. 1 | Ex. 2 | Ex. 3 | Ex. 4 | Comp. Ex. 1 | Comp. Ex. 2 |
|---|---|---|---|---|---|---|
| Whiteness by the Berger Method [%] | 93 | 91 | 91 | 90 | 91 | 84 |
| Longitudinal modulus of elasticity [N/mm$^2$] | 3600 | 3600 | 3650 | 3650 | 3350 | 3500 |
| Transverse modulus of elasticity [N/mm$^2$] | 5200 | 5300 | 5200 | 5300 | 5300 | 5300 |
| Longitudinal tear strength [N/mm$^2$] | 150 | 155 | 155 | 150 | 150 | 150 |
| Transverse tear strength [N/mm$^2$] | 240 | 240 | 235 | 240 | 250 | 250 |
| Longitudinal elongation at break [%] | 175 | 180 | 175 | 170 | 180 | 175 |
| Transverse elongation at break [%] | 70 | 75 | 75 | 75 | 70 | 80 |
| Coloration | bril-liant white | bril-liant white | bril-liant white | bril-liant white | bril-liant white | tinged yellow |
| Adhesion with respect to printing inks and photographic emulsions 1 = excellent; 2 = poor | 1 | 1 | 1 | on one side 1 | 2 | 2 |

What is claimed is:

1. An opaque, white film with a thickness of from 10 to 500 μm, wherein the film comprises thermoplastic, a pigment, and at least one optical brightener, wherein said thermoplastic consists entirely of polyester and said pigment consists entirely of barium sulfate, wherein the barium sulfate or the optical brightener, or the barium sulfate and the optical brightener have been incorporated directly into the thermoplastic or are fed as a masterbatch during film production, and wherein at least one surface of the film bears a functional coating with a thickness of from 5 to 10 nm, wherein the luminous transmittance of the film is reduced when the longitudinal stretch ratio is increased for a film of the same thickness, said film exhibiting a modulus of elasticity in the transverse direction of greater than or equal to 4200 N/mm$^2$.

2. The film as claimed in claim 1, wherein the thermoplastic has been selected from the group consisting of polyethylene terephthalate, polybutylene terephthalate and polyethylene naphthalate.

3. The film as claimed in claim 1, wherein from 0.2 to 40% by weight of barium sulfate is present as pigment into film, based on the weight of the thermoplastic, and wherein the barium sulfate is fed by way of masterbatch technology during film production.

4. The film as claimed in claim 1, wherein, based on the weight of the thermoplastic, from 10 to 50,000 ppm of optical brightener is present in the film, and wherein the optical brightener is fed by way of masterbatch technology during film production.

5. The film as claimed in claim 4, wherein the optical brightener has been selected from the group consisting of bisbenzoxazoles, phenylcoumarins and bisstearylbiphenyls.

6. The film as claimed in claim 1, wherein, in addition to the optical brightener, a polyester-soluble blue dye selected from the group consisting of cobalt blue, ultramarine blue, anthraquinone dyes or combinations of these, is also present m the film, and wherein the amount of blue dye present in the film is from 10 to 10,000 ppm, based on the weight of the thermoplastic.

7. The film as claimed in claim 1, wherein the barium sulfate is present as precipitated barium sulfate in the film in an amount of from 0.5 to 30% by weight, based on the weight of the thermoplastic, and wherein the average grain size of the barium sulfate is from 0.1 to 5 μm, (Sedigraph method).

8. The film as claimed in claim 1, wherein the surface gloss of the film, measured to DIN 67530 (measurement angle 20°) is ≧10, and wherein the luminous transmittance (transparency) of the film, measured to ASTM-D 1003 is ≦30 %.

9. The film as claimed in claim 1, wherein the film has one or more layers, and the film having more than one layer comprises at least one base layer and at least one outer layer.

10. The film as claimed in claim 1, wherein at least one of the surface of the film bears a functional coating with a thickness of from 20 to 70 nm, and the coating has been applied as solution, suspension or dispersion, and wherein the coating comprises substances or compositions selected from the group consisting of acrylates, ethylvinyl alcohols, PVDC, waterglass (Na$_2$ SiO$_4$), hydrophilic polyesters, vinyl acetates, polyvinyl acetates, polyurethanes, silanes, the alkali metal or alkaline earth metal salts of C$_{10}$–C$_{18}$ fatty acids, butadiene copolymers with acrylonitrile or methyl methacrylate, methacrylic acid, acrylic acid or esters thereof and mixtures of these.

11. The film as claimed in claim 10, wherein the coating comprises from 0.05 to 5% by weight of additional additives.

12. The opaque white film as claimed in claim 1, wherein said opaque white film further comprises regrind formed from said film in amounts of up to 50 weight percent, said film having a thickness of up to 50 microns and exhibiting a yellowness of up to 20.

13. The opaque white film as claimed in claim 1, wherein said opaque white film further comprises regrind formed from said film in amounts of up to 50 weight percent, said film having a thickness of from 50 to 250 microns and exhibiting a yellowness of up to 45.

14. The opaque, white film as claimed in claim 1, wherein the luminous transmittance of said film 15 to 20% lower than the luminous transmittance of a comparable film formed from said thermoplastic having the same thickness as said film and lower longitudinal orientation than said film.

15. An opaque, white film with a thickness of from 10 to 500 μm, wherein the film comprises a crystallizable thermoplastic, barium sulfate, and at least one optical brightener, wherein said crystallizable thermoplastic consists entirely of polyester, wherein the barium sulfate or the optical brightener, or the barium sulfate and the optical brightener have been incorporated directly into the crystallizable thermoplastic or are fed as a masterbatch during film production, and wherein at least one surface of the film bears a functional coating with a thickness of from 5 to 10 nm, wherein the luminous transmittance of the film is reduced when the longitudinal stretch ratio is increased for a film of the same thickness, said film exhibiting (a) a modulus of elasticity in the machine direction of at least 3300 N/mm² and in the traverse direction of greater than or equal to 4200 N/mm²;
(b) tear strengths in the machine direction of greater than or equal to 120 N/mm² and in the transverse direction of greater than or equal to 170 N/mm²; and
(c) elongations at break of greater than or equal to 120% in the machine direction and greater than or equal to 50% in the transverse direction.

* * * * *